(12) United States Patent
Bush et al.

(10) Patent No.: US 8,176,003 B2
(45) Date of Patent: May 8, 2012

(54) AUTOMATIC DESIGNATION OF XBRL TAXONOMY TAGS

(75) Inventors: Michael Allen Bush, Highlands Ranch, CO (US); Daniel Barnett, Centennial, CO (US); Jeffrey B. Cutting, Aurora, CO (US); Angela Selman, Centennial, CO (US)

(73) Assignee: Microsoft Corporation, Redmond, WA (US)

( * ) Notice: Subject to any disclaimer, the term of this patent is extended or adjusted under 35 U.S.C. 154(b) by 579 days.

(21) Appl. No.: 11/771,622

(22) Filed: Jun. 29, 2007

(65) Prior Publication Data
US 2009/0006472 A1    Jan. 1, 2009

(51) Int. Cl.
G06F 7/00 (2006.01)
G06F 17/00 (2006.01)
G06F 17/30 (2006.01)

(52) U.S. Cl. .................. 707/602; 707/758; 707/777

(58) Field of Classification Search .............. 707/1–5, 707/10, 100, 104, 999.001–999.005, 999.1, 707/999.01, 602, 758, 777
See application file for complete search history.

(56) References Cited

U.S. PATENT DOCUMENTS

| | | | |
|---|---|---|---|
| 6,947,947 B2 | 9/2005 | Block | |
| 2003/0041077 A1* | 2/2003 | Davis et al. | 707/500 |
| 2003/0101163 A1* | 5/2003 | Lui et al. | 707/1 |
| 2005/0021427 A1 | 1/2005 | Takahashi | |
| 2005/0182777 A1* | 8/2005 | Block et al. | 707/100 |
| 2005/0246269 A1 | 11/2005 | Smith | |
| 2006/0041492 A1 | 2/2006 | Takahashi et al. | |
| 2006/0184539 A1* | 8/2006 | Blake et al. | 707/10 |
| 2006/0230025 A1 | 10/2006 | Baelen | |
| 2006/0242181 A1 | 10/2006 | Mueller-Klingspor | |
| 2006/0242624 A1 | 10/2006 | Mueller-Klingspor | |
| 2007/0050698 A1 | 3/2007 | Chopin et al. | |
| 2007/0050702 A1 | 3/2007 | Chopin | |
| 2007/0078877 A1* | 4/2007 | Ungar et al. | 707/101 |
| 2007/0244775 A1* | 10/2007 | Linder | 705/35 |
| 2008/0059482 A1* | 3/2008 | Rohan et al. | 707/10 |
| 2008/0250157 A1* | 10/2008 | Ohata | 709/236 |

OTHER PUBLICATIONS

Declerck, T., and Krieger, H.-U. Translating XBRL into description logic. An approach using Protege, Sesame & OWL. Jun. 2, 2006, in Proceedings of the 9th International Conference on Business Information Systems (BIS).*

A. Deshmukh, Digital Accounting. Jan. 2006. The Effects of the Internet and ERP on Accounting, Idea Group, Inc.*

Extensible Financial Reporting Markup Language (XFRML), Technology Reports, Apr. 12, 2000; http://xml.coverpages.org//xfrmal.html.

(Continued)

*Primary Examiner* — Mohammad Ali
*Assistant Examiner* — Kannan Shanmugasundaram
(74) *Attorney, Agent, or Firm* — Merchant & Gould P.C.

(57) ABSTRACT

The embodiments described herein generally relate to new and alternate systems and methods to associate XBRL tags with financial data. A business user creates a design template that can be used one or more times to create an instance of an XBRL document. A user can select a user interface element to have a system automatically map the XBRL taxonomy tags with portions of financial information. Upon selecting the user interface element, the system determines the best matches for the financial information and the XBRL taxonomy. The matches are recorded or stored in the design template.

15 Claims, 6 Drawing Sheets

OTHER PUBLICATIONS

Nakasumi, "Credit Risk Management System on e-Commerce: Case Based Reasoning Approach," pp. 438-449, 2003. http://delivery.acm.org/10.1145/950000/948062/p438-nakasumi.pdf?key1=948062&key2=9886744711&coll=GUIDE&dl=GUIDE&CFID=75919783&CFTOKEN-92791909.

Extensible Business Reporting Language (XBRL) 2.1, Public Working Draft, Apr. 23, 2003, pp. 1-93. http://xml.coverpages.org/XBRL-WD20030423.pdf.

International Search Report and Written Opinion for PCT Application No. PCT/US2008/067839 dated Jan. 14, 2009.

* cited by examiner

AUTOMATIC DESIGNATION OF XBRL TAXONOMY TAGS

BACKGROUND

Many organizations and government institutions are requiring the reporting of financial data using an electronic format. One format that has become increasingly popular among these organizations and government institutions is eXtensible Business Reporting Language (XBRL). To create a XBRL document for submission to an organization, a business must match an XBRL taxonomy with the source data, then generate the required output document from the source data and the taxonomy. The taxonomy is a definition of the information and relationships between the information needed in the required output. To create the required output, the business matches XBRL tags in the taxonomy with information in the business' accounting or other financial data. Upon matching the tags with the financial data, an XBRL document can be created with the financial information Unfortunately, the process of matching the XBRL tags with financial information is difficult. Generally, businesses must complete the process by assigning manually the XBRL tag to a portion of financial data in some rudimentary way, typically in a software program that may or may not have been designed for this purpose, for example, a spreadsheet program. In more difficult situations, the business user must manipulate the XBRL documents themselves to create the appropriate match, which is a time consuming and tedious process because XBRL documents were designed to be processed by computers and not manually edited.

The process of matching the XBRL tags becomes extremely difficult if there are numerous XBRL tags and many different portions of financial data that require review. Further, the process is more complicated when the business user must complete the process over and over for each subsequent reporting of the financial data, for example, for reporting each month the balance sheet report. The reporting of the XBRL documents becomes prohibitively difficult as the number of data items and frequency of reporting increases. As more and more entities mandate the use of these machine-readable formats, such as XBRL, for financial reporting, software will have to increasingly perform these operations for the user.

SUMMARY

The embodiments described herein generally relate to new and alternate systems and methods to associate taxonomy tags with data for the purpose of generating an instance document in a machine-readable format, for example, XBRL. In one embodiment, a business user creates a design template that can be used one or more times to create an instance of an XBRL document. In creating the design template, a user, in embodiments, must associate or map XBRL taxonomy tags with portions of a general ledger, other financial information, business information, or other information, designated as "Rows" in this embodiment. A system automatically matches the taxonomy tags with the portions of financial information. The matches can be recorded or stored in the design template for later and repeated use by the system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
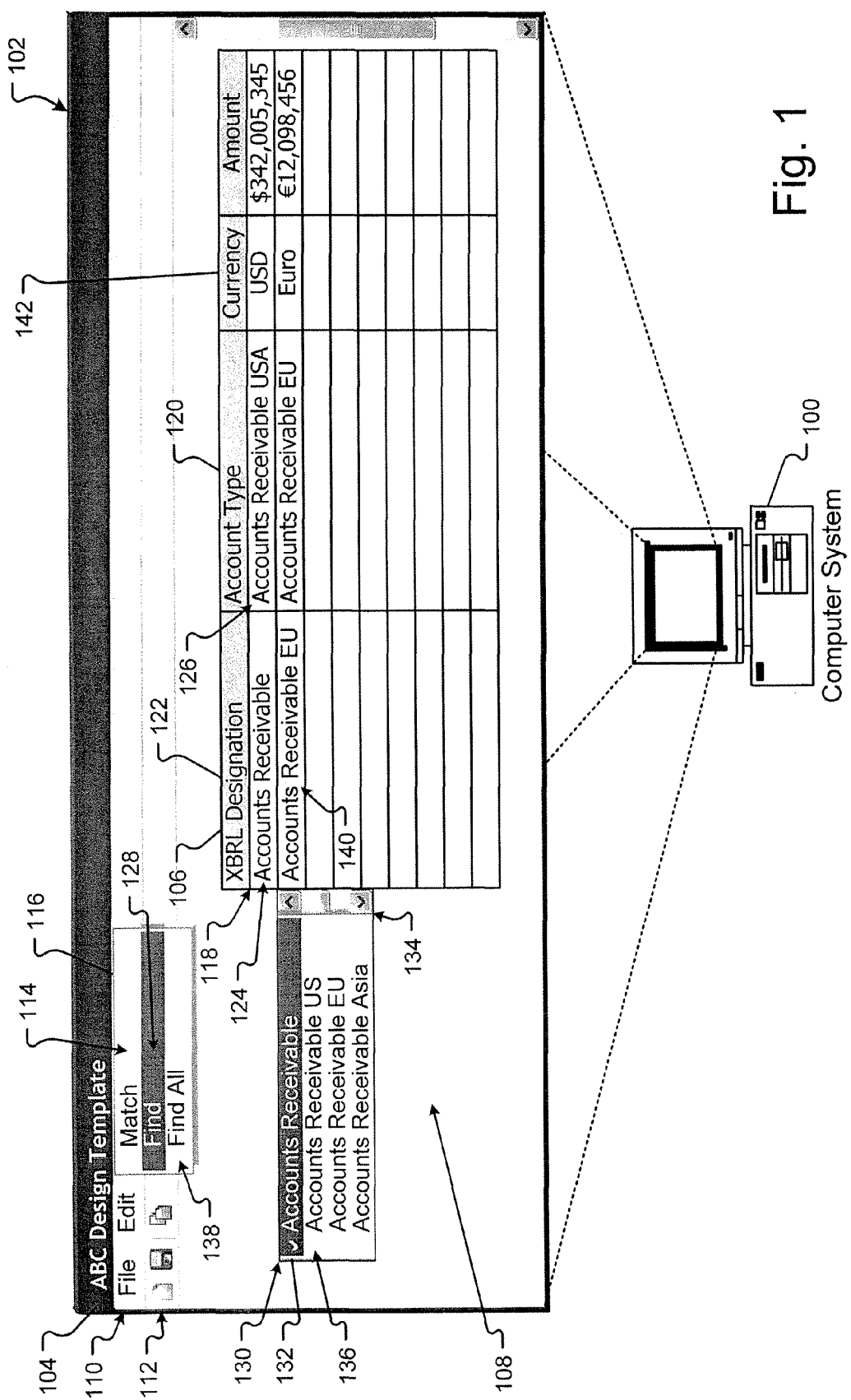
FIG. 1 is a depiction of an embodiment of a user interface for assigning taxonomy tags to financial data.

This disclosure will now more fully describe some embodiments with reference to the accompanying drawings, in which only some of the possible embodiments are shown. Other aspects may be embodied in many different forms and should not be construed as limited to the embodiments set forth herein. Rather, these embodiments are provided so that this disclosure will convey the scope of the possible embodiments to those skilled in the art.

Embodiments of the present invention generally relate to new and alternate methods and systems for automatically mapping taxonomy tags with data. In embodiments, the taxonomy is an XBRL taxonomy and the data is financial data. In other embodiments, the taxonomy is another type of machine-readable format and the data is another form of data. To create an XBRL document, also referred to as an XBRL instance document, a business creates a mapping between an XBRL taxonomy and the business' financial or other information. An XBRL taxonomy is a set of data that describes the contents of the XBRL instance document and the relationships between the contents of the XBRL instance document. An XBRL taxonomy may be defined by a third-party organization desiring and using the XBRL instance document. In this way, the third-party organization can define the type and format of the information needed. In other embodiments, the XBRL taxonomy is created or modified by the business sending the information. In this way, the business can adapt the XBRL document to the business' existing accounting or reporting systems. XBRL taxonomies can be defined in terms of other taxonomies, providing for compound taxonomies.

The XBRL instance document is "an instance" of a report to the receiving organization and represents a snapshot in time of data (financial or otherwise) that conforms to the applied taxonomy's rules and nomenclature. For example, if the receiving organization is the SEC, the XBRL instance document may be a quarterly financial statement. The XBRL instance document may provide amounts of money associated with XBRL tags. For example, the quarterly financial statement may have an XBRL tag of "<Revenue>" and the associated amount of money may be 23,000,000. The information in the XBRL instance documents may be used for reporting, compliance or other actions. To create the XBRL instance document, the business, in embodiment, maps the XBRL tags in the XBRL taxonomy with business information, for example, a general ledger.

In embodiments, a business associates the XBRL taxonomy tags with portions of the business's information to create a design template. For purposes of explanation, the business information hereinafter described will be the general ledger of the business' accounting system. However, in other embodiments, other business information, for example, human resources information, marketing information, etc., is mapped. A general ledger may be a Microsoft® Excel Spreadsheet or another ledger from an accounting system such as Microsoft® Dynamics GP.

A design template, in embodiments, is a template of the XBRL instance document that contains the associations between the general ledger and the XBRL taxonomy. The design template, in other embodiments, may include one or more other items of information, including, but not limited to, footnotes, notes or comments, formatting, titles, or display properties. In embodiments, the business associate maps the XBRL taxonomy to the general ledger when creating the design template. The business associate may create the design template every time an XBRL instance document is required or once for several instances of an XBRL document. Regardless, the business associate maps the XBRL tags to portions of or items of information in the general ledger.

In further embodiments, other information is used in the mapping process. For example, one or more formulas allow the XBRL instance document to incorporate information from one or more other information sources beyond the general ledger. This information may allow data in the XBRL instance document to be corrected or combined with other information. Combining or correcting information using other sources expands the current capabilities of XBRL functionality and allows more than a one-to-one mapping of taxonomy tags and data.

An embodiment of a system 100 with a user interface 102 allowing a business associate or user to map taxonomy tags to a general ledger is shown in FIG. 1. The user interface 102 includes a display of a window 104 for a design template 106. In embodiments, the user interface 102 receives selections from a user operating a user selection device, for example a mouse or a keyboard. Further explanation of the user interface and input and output devices is provided in conjunction with FIG. 6. The window 104 comprises a display area 108 and one or more selectable icons, menus, elements, or other devices, for example, menu bar 110 and button bar 112. When selecting a menu device, such as menu device 114, a drop-down menu may be displayed, such as menu 116. In embodiments, a user selects the "Match" menu 114 to have a taxonomy tag automatically matched or associated with a portion of financial data, for example, a row in a general ledger. The user interface 102 may receive selections for the XBRL taxonomy to be used and a selection for the financial or other data to use, for example, a selection of a general ledger. The selections for the XBRL taxonomy and financial data may be made in another menu (not shown), pop-up menu (not shown), or some other user-interface device.

In embodiments, a user creates a row in the design template 106 to associate a portion of financial data, or row, in the general ledger with a taxonomy tag in the XBRL taxonomy. A user may create one or more rows in the design template 106. For example, row 118 may associate the "Accounts Receivable USA" row in the general ledger (represented in column 120) with the "Accounts Receivable" taxonomy tag (represented in column 122). The taxonomy tag 124 may be automatically matched to and associated with the account designation 126 that is imported from the general ledger.

A user, in embodiments, chooses a user interface device to automatically match or associate a taxonomy tag 124 with the account designation 126. For example, the user may choose menu option 128 to find a taxonomy tag match in the XBRL taxonomy with the account designation 126. In embodiments, another user interface element or device, for example, pop-up menu 130, is displayed that shows one or more "near" matches from which a user may choose. Embodiments of how "near" or "close" matches are determined is explained in more detail in conjunction with FIG. 4. A user may choose a selection from the menu 130, for example, the selection 132 for "Accounts Receivable." A user may also scroll through the menu 130, using scroll bar 134 to choose another menu option, for example, menu option 136 for "Accounts Receivable US." In embodiments, a match provides the closest options to the account type represented in column 120; the user may choose the exact match.

In other embodiments, the closest match is automatically inserted into the "XBRL Designation" column 122. For example, the system 100 matches the account type "Accounts Receivable USA" 126 with the taxonomy tag "Accounts Receivable" 124 and inserts the taxonomy tag 124 into the "XBRL Designation" column 122 for the row 118. The taxonomy tag 124 is displayed as mapped to the portion of financial data 126 in a view of a design template 106. The taxonomy tag 124 is associated with the portion of the financial data 126 in the design template 106. In this way, the user need not select a match but can allow the system 100 to match the taxonomy tag with the account type in the general ledger.

Further embodiments allow a user to have the system 100 match all the accounts in the design template 106 with a taxonomy tag. For example, the user chooses a user interface element, such as the "Find All" menu option 138 to have all accounts matched with taxonomy tags. The system 100, in embodiments, then matches each row value having an account type in column 120 with a taxonomy tag and inserts the taxonomy tags in column 122 for each row. For example, the system 100 inserts tags 124 and 140 into the design template 106. Thus, a user need not select any taxonomy tags for any portion of the financial data in the general ledger. In further embodiments, a user may manually edit any mismatched taxonomy tags. In other embodiments, a preview of the tag matching is provided to the user. and the user may select to accept the automatically matched tags. In contrast, in an alternative embodiment, a user may undo one or more of the automatically matched tags after the tags have been matched.

Figure 2:
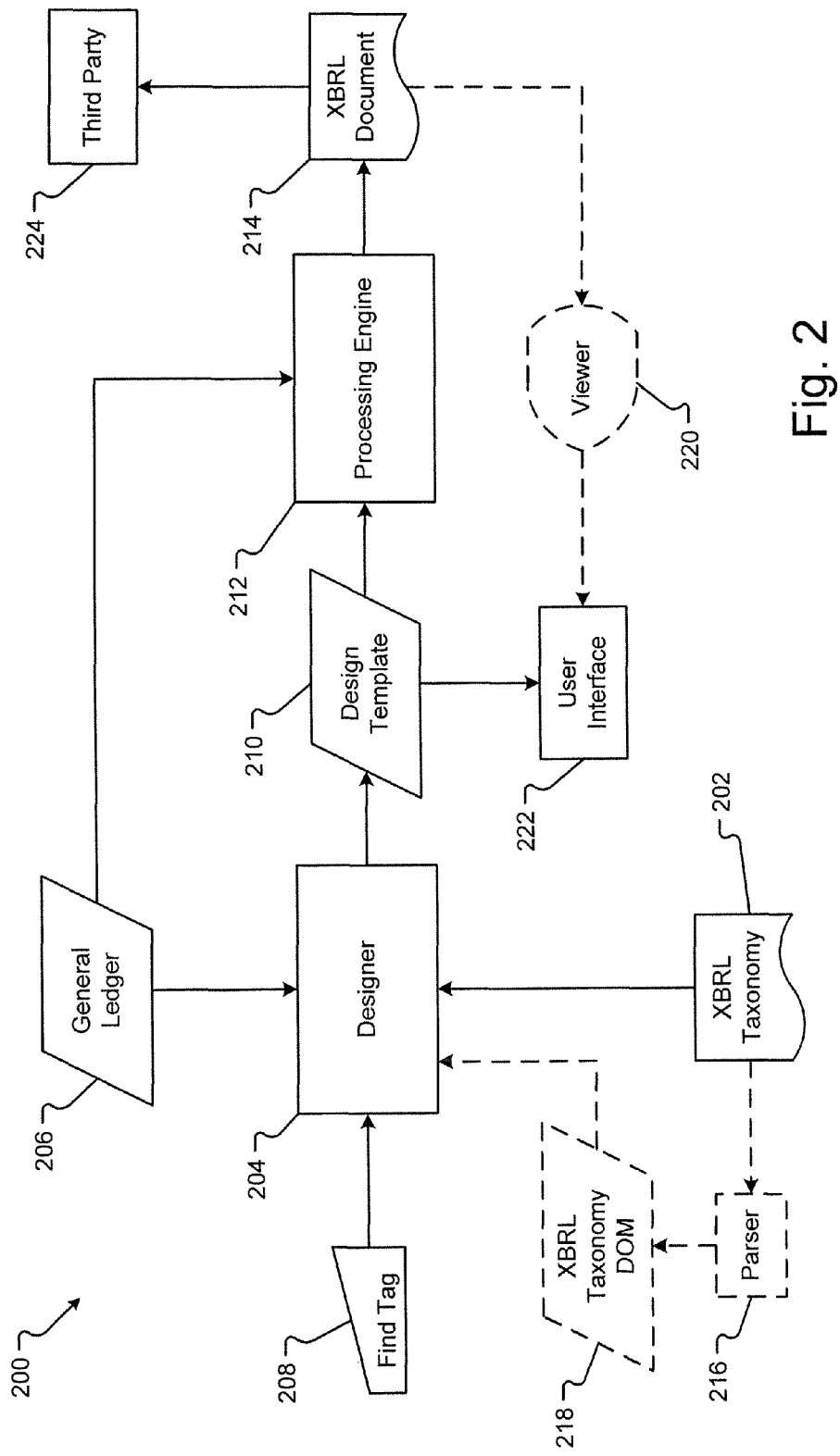
FIG. 2 is a block diagram of a system for assigning tags to financial data in a design template and applying the design template to output an XBRL document.

A system 200 for automatically associating or mapping taxonomy tags with portions of financial data and generating XBRL instance documents is shown in FIG. 2. In embodiments, the system 200 comprises one or more components that perform one or more functions or operations. The components may be software modules or code executed on a computer system or, in other embodiments, may be a set of hardware or logic gates specifically designed to perform the functions described herein. The components may be in communication with each other to perform the operations described herein or to exchange data between the several components. The components may communicate by any form of communication including wired or wireless communication using any protocol or format known in the art. One skilled in the art will recognize that the components represented in FIG. 2 are not limited to the implementation details described herein but that the implementation details are provided for explanation purposes.

In embodiments, the system 200 comprises a designer application component 204 and a processing engine component 212. The designer application component 204, in embodiments, receives selections for and imports an XBRL taxonomy 202 and financial data, for example, general ledger 206. In further embodiments, the designer application component 204 receives a selection 208 to map automatically a taxonomy tag to a portion of the financial data, for example, a row in the general ledger 206. The designer application 204, in embodiments, outputs a design template 210, which may be sent to the processing engine 212 and/or the user interface 222 for viewing by the user. The user interface 222 may be similar or the same as the user interface 102 shown in FIG. 1. The design template 210 may be used in repeated creations of the XBRL instance document with data updated in the general ledger at a second time. In other embodiments, the design template 210 is stored but not sent to the processing engine. The design template 210 may then be imported into another system to create that systems matching of tags to financial data. In embodiments, the associations of tags and data is checked for correctness. For example, the design template 210 is output to the user for inspection. In alternative embodiments, each match is checked if it has a confidence interval in the correlation that is higher that a predetermined threshold, for example, 90%.

The processing engine 212, in embodiments, receives the design template 210 and imports financial data, for example, from the general ledger 206, to associate the design template 210 with the financial data 206 and to generate an XBRL instance document 214. In embodiments, the XBRL instance document 214 is sent to a viewer 220 to provide a view of the XBRL instance document 214 in the user interface 222. In further embodiments, the XBRL instance document 214 is sent to a third party 224 for importation and processing. For example, the XBRL instance document 214 is a financial reporting that is sent to the IRS for tax purposes.

In alternative embodiments, a parser 216 imports the XBRL taxonomy 202 and parses the XBRL taxonomy 202. The parsed XBRL taxonomy forms an XBRL taxonomy document object model (DOM) 218. An XBRL taxonomy DOM 218 is a representation of the XBRL taxonomy 202 where the different elements of the XBRL taxonomy 202 are represented by separate software objects (also referred to as "objects"). For example, each taxonomy tag in the XBRL taxonomy 202 is represented by a software object in the XBRL taxonomy DOM 218. The XBRL taxonomy DOM 218 is further explained in conjunction with FIG. 3.

The parser can provide the XBRL taxonomy DOM 218 to the designer application component 204, which may import the XBRL taxonomy DOM 218 to create the design template 210. The designer application component 204, in embodiments, traverses the XBRL taxonomy DOM 218 to compare one or more attributes of the DOM objects to the selected portion of the financial data. For example, the taxonomy tag name may be an attribute of the DOM object and compared to a descriptor of the financial data, for example, an account title. The designer application component 204 may have one or more components that accomplish the generation of the design template 210.

Figure 3:
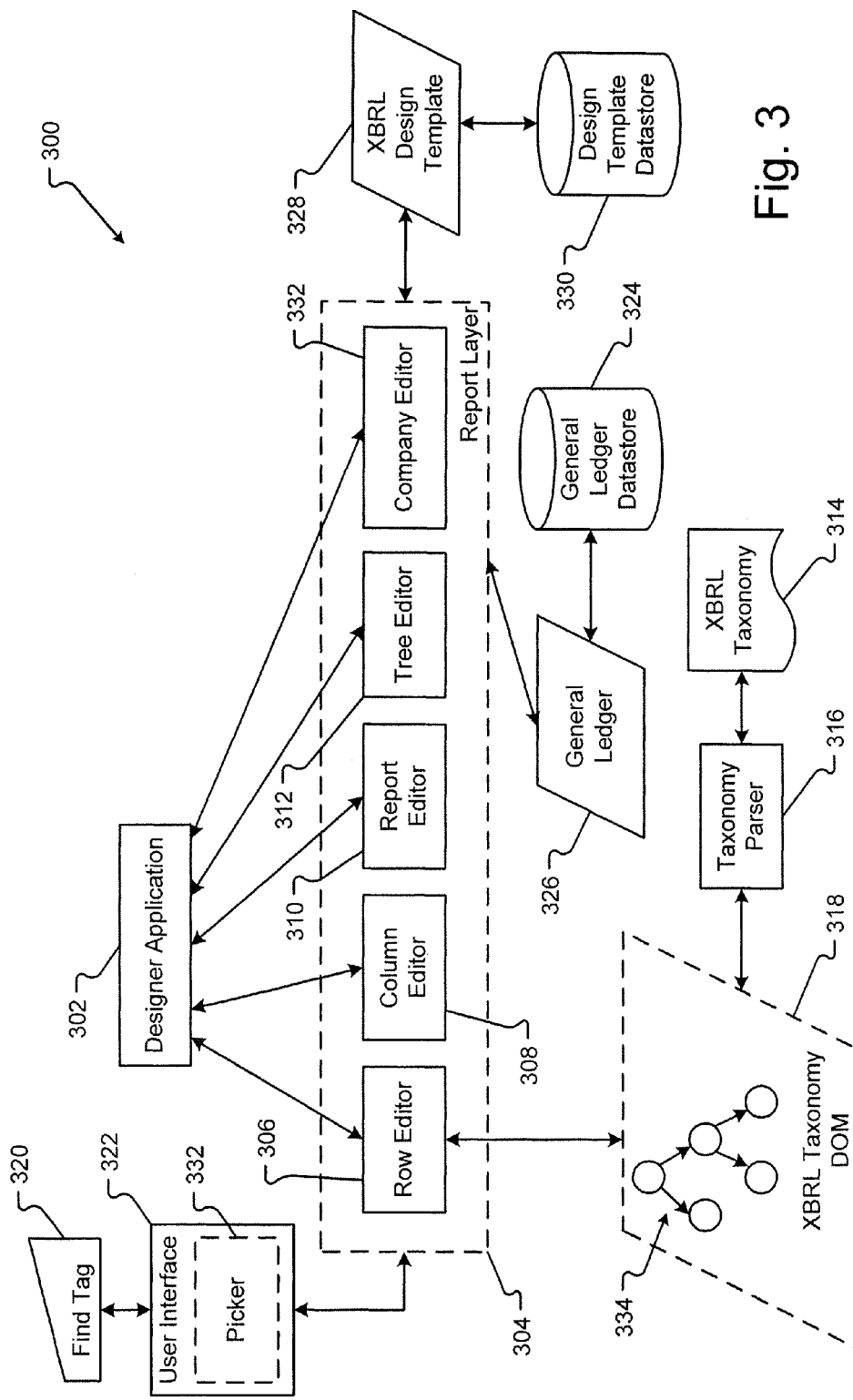
FIG. 3 is a block diagram of an embodiment of a system for designing an XBRL template that includes taxonomy tags automatically assigned to financial data.

An embodiment of a system 300 comprising a designer application 302 is shown in FIG. 3. In embodiments, the system 300 comprises one or more components that perform one or more functions or operations. The components may be software modules or code executed on a computer system or, in other embodiments, may be a set of hardware or logic gates specifically designed to perform the functions described herein. The components may be in communication with each other to perform the operations described herein or to exchange data between the several components. The components may communicate by any form of communication including wired or wireless communication using any protocol or format known in the art. One skilled in the art will recognize that the components represented in FIG. 3 are not limited to the implementation details described herein but that the implementation details are provided for explanation purposes.

The designer application 302, in embodiments, includes a report layer 304. The report layer 304 may contain one or more subcomponents that execute to generate portions of the XBRL design template 328. In embodiments, the report layer 304 includes one or more of, but is not limited to, a row editor 306, a column editor 308, a report editor 310, a company editor 332, and a tree editor 312.

The column editor 308 can communicate with the user interface 322 to receive information related to the columns, for example, column 142 (FIG. 1), in the design template 328. The information, in embodiments, includes one or more of, but is not limited to, formatting, notes, footnotes, or other information regarding the data in the columns of the XBRL design template 328. In an alternative embodiment, the column editor 308 receives information related to data in a general ledger 326 that may be parameterized by a column. The report editor 310 may also receive information from the user interface 322. The information received by the report editor 310 may include one or more of, but is not limited to, general business information, formatting, notes, footnotes, XBRL instance document formatting or display properties, corporate notes and general footnotes, or other information. The tree editor 312 can also communicate with the user interface 322 to receive information. The information received by the tree editor 312 may include, but is not limited to, formatting, notes, footnotes, changes to a view of the XBRL instance document. In embodiments, the XBRL instance document is represented by a hierarchical view, for example, a tree or cascading file diagram. The tree editor 312 may change the hierarchical view of the XBRL instance document based on the received information. A company editor 332, in embodiments, can communicate with the user interface 322 to receive information about the company or institution creating the XBRL instance document. The information may include one or more of, but is not limited to, formatting, notes, footnotes, the companies address and contact information, the companies officers or directors, and other formatting.

The row editor 306, and, in embodiments, the report editor 310, the company editor 332, the column editor 308, and/or the tree editor 312, can import the XBRL taxonomy 314 and the general ledger 326 to generate and edit the rows in the XBRL design template 328. In embodiments, the row editor 306 automatically maps XBRL taxonomy tags in the XBRL taxonomy 314 with rows in the general ledger 326. In embodiments, mapping is as described in conjunction with FIG. 2. The row editor 306 stores the associations between the XBRL taxonomy tags in the XBRL taxonomy 314 and the rows in the general ledger 326 into the XBRL design template 328. The row editor, in embodiments, also includes information about the data in the row, which includes one or more of, but is not limited to, formatting, notes, footnotes, or other information regarding the data in the columns of the XBRL design template 328.

In one embodiment, the row editor 306 includes a picker 332, also referred to as tag picker, which may be an element in the user interface 322 for receiving selections from the user to find matches between the XBRL taxonomy tags in the XBRL taxonomy 314 and the rows in the general ledger 326. The picker may be a menu, for example, menu 114 (FIG. 1). In alternative embodiments, the picker may allow a user to select from a list of similar taxonomy tags, for example, menu 130 (FIG. 1). In embodiments, the picker 332 component of the row editor 306 receives a selection 320 from the user interface 322 to map a taxonomy tag to a portion of financial data in the general ledger 326.

In alternative embodiments, the system 300 also includes a taxonomy parser 316. In embodiments, the taxonomy parser 316 parses the XBRL taxonomy 314 similarly to the process explained in conjunction with FIG. 2. The taxonomy parser 316 can parse the XBRL taxonomy 314 to form an XBRL taxonomy DOM 318. In embodiments, the XBRL taxonomy DOM 318 is a representation of the XBRL taxonomy 314 where the different elements of the XBRL taxonomy 314 are represented by separate software objects (also referred to as "objects"). For example, each taxonomy tag in the XBRL taxonomy 314 is represented by a software object in the XBRL taxonomy DOM 318. In embodiments, the taxonomy parser 316 creates a software object or document object for each element in the XBRL taxonomy 314. For example, an object is created for each XBRL taxonomy tag. In further embodiments, the taxonomy parser 316 parses the XBRL taxonomy 314 to create a hierarchical or tree structure in the XBRL taxonomy DOM 318. An XBRL taxonomy 314 has interrelationships like other taxonomies. The taxonomy structure mimics a biological taxonomy with kingdoms, genus, species, etc. In other words, the taxonomy tags may have children tags or parent tags.

In embodiments, the XBRL taxonomy DOM 318 is a tree structure object model. A first object may be a parent to one or more other objects. A parent object is a higher order object to its children objects. A representation of a simple hierarchical XBRL taxonomy DOM 334 is shown in FIG. 3. The tree structure in the XBRL taxonomy DOM 318 represents the interrelationships in the XBRL taxonomy 314. Each object in the XBRL taxonomy DOM 318 may also have one or more attributes. One attribute for the XBRL taxonomy DOM 318 objects may be a title attribute or name for the object. The title attribute may contain the name of the taxonomy tag in the XBRL taxonomy 314. XBRL taxonomy DOM 318 objects may have other attributes. Two or more XBRL taxonomy DOM 318 objects may have the same or similar title attributes. In this situation, one or more other attributes may differentiate the two XBRL taxonomy DOM 318 objects. The row editor 306 may traverse the XBRL taxonomy DOM 318. In finding two or more objects with the same or similar title attributes, the row editor 306 may provide several selections, such as menu 130 (FIG. 1), to allow the user to choose a taxonomy tag using the tag picker 332.

A general ledger 326 may be provided to the report layer 304 to create the XBRL design template 328. In embodiments, the system may store two or more general ledgers in one or more general ledger datastores 324. The user may choose a general ledger 326 to create the XBRL design template 328.

In further embodiments, the system 300 may create one or more XBRL design templates, such as XBRL design template 328. In embodiments, the XBRL design templates are stored in an XBRL design template datastore 330. When a processing engine 212 (FIG. 2) generates an XBRL instance document 214 (FIG. 2), the processing engine 212 (FIG. 2) may retrieve an XBRL design template from the XBRL design template datastore 330. Thus, one XBRL design template may be used two or more times to generate two or more XBRL instance documents.

Figure 4:
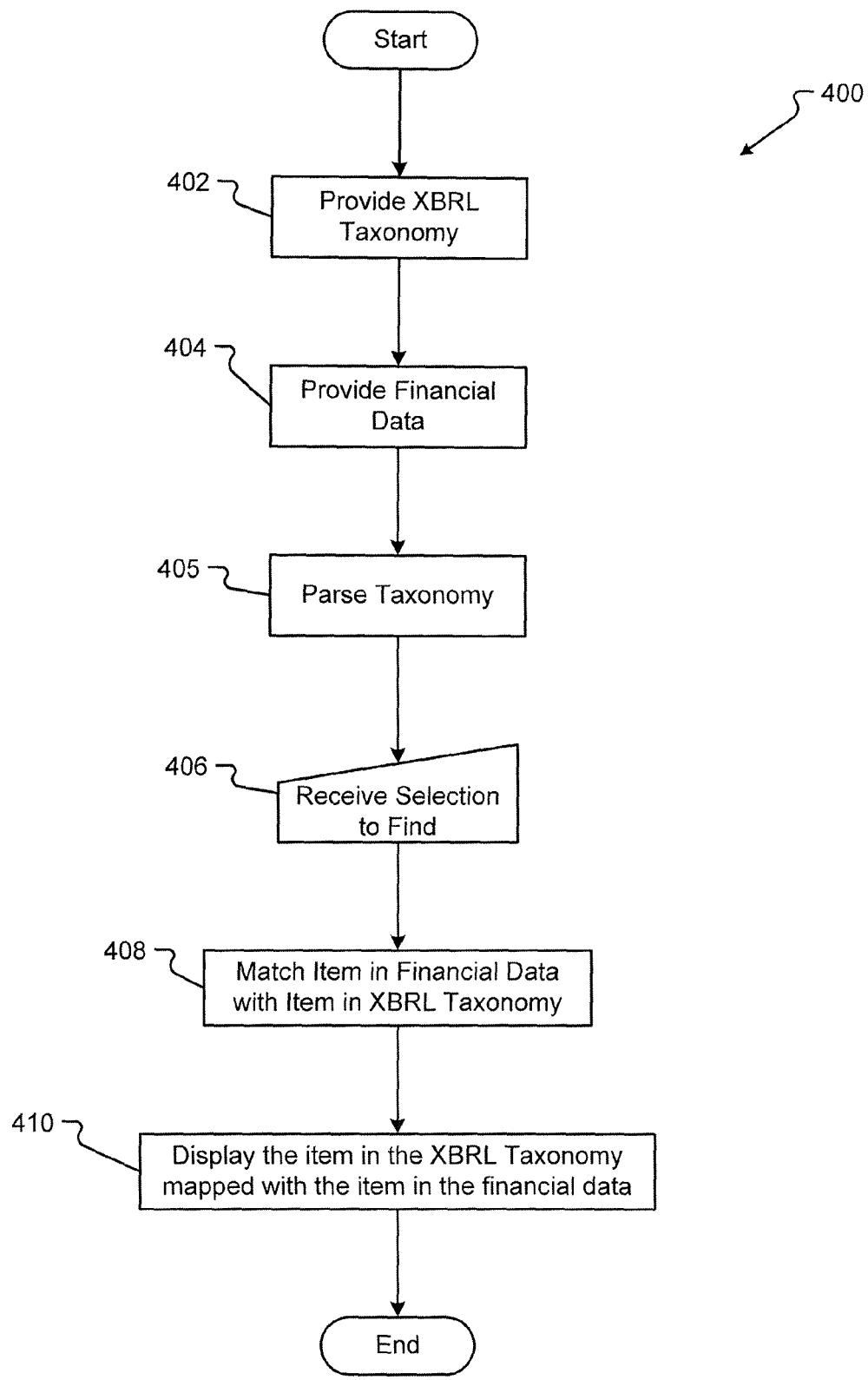
FIG. 4 is a flow diagram of an embodiment of a process for assigning taxonomy tags to data.

An embodiment of a method 400 for automatically matching or mapping a taxonomy tag with a portion of financial data is shown in FIG. 4. In embodiments, the steps described in conjunction with FIG. 4 are computer instructions executed on a computer system. The method 400 generally starts with a "Start" function and ends with an "End" function.

Provide operation 402 provides an XBRL taxonomy. In an embodiment, a user selects, using a user interface 102 (FIG. 2), an XBRL taxonomy, for example XBRL taxonomy 314 (FIG. 3). The XBRL taxonomy may be retrieved from a local or remote storage device. In alternative embodiments, the XBRL taxonomy is downloaded from a taxonomy provider website.

Provide operation 404 provides financial data. In alternative embodiments, provide operation 404 occurs before provide operation 402. Financial data may include a general ledger, for example, general ledger 326 (FIG. 3). The financial data may be retrieved from local or remote storage, for example, the general ledger datastore 324 (FIG. 3). The financial data, in alternative embodiments, is gathered from two or more sources and combined. A user may select, using a user interface 102 (FIG. 1), which financial data to retrieve.

In embodiments, parse operation 405 parses a taxonomy. In an embodiment, a taxonomy parser 316 (FIG. 3) parses an XBRL taxonomy 314 (FIG. 3) to create an XBRL taxonomy DOM 318 (FIG. 3). As explained in conjunction with FIG. 3, the parser 316 (FIG. 3) creates one or more objects associated with one or more elements in the XBRL taxonomy. In embodiments, a type of financial data or other data is selected by the user. An attribute is determined to search on in the DOM 318 (FIG. 3). For example, the title attribute is used for the search. All other attribute data is discarded from the search all other attributes that do not apply to the match or the comparison. For example, a different attribute is ignored during the matching process.

In embodiments, receive operation 406 receives a selection to find a match between a portion of financial data and a taxonomy tag. A user, in embodiments, selects a user interface element, such as menu selection 128 (FIG. 1). The user selection can generate a find tag input 208 (FIG. 2). A designer application 204 (FIG. 2) or the row editor 306 (FIG. 3) of the designer application 302 (FIG. 3) can receive the find tag input 320 (FIG. 3).

Match operation 408 matches an item in the financial data with an item in the XBRL taxonomy. In embodiments, a row editor 306 (FIG. 3) matches a title for a row in a general ledger 326 (FIG. 3) with a taxonomy tag, represented as a title attribute in an XBRL taxonomy DOM 318 (FIG. 3). The title of the row may be an account name or designation, such as an account title 126 (FIG. 1). The match operation may use one of several algorithms to match the taxonomy tag with the portion of the financial data.

In one embodiment, the match algorithm may match the exact and full taxonomy tag with the exact and full title of the account. Thus, in embodiments, the row editor 306 (FIG. 3) traverses the XBRL taxonomy DOM 318 (FIG. 3) comparing the name of the taxonomy tag with the title attribute of a first object, e.g., the highest order XBRL taxonomy DOM 318 object. If the taxonomy tag and the title attribute do not exactly match, the row editor 306 (FIG. 3) can traverse the link between the first object and a second object, e.g., the first object's one or more children objects. The row editor 306 (FIG. 3) may then compare the taxonomy tag with the title attributes of the children objects. In embodiments, the row editor (FIG. 3) continues to traverse the XBRL taxonomy DOM 318 (FIG. 3) until it makes the first successful comparison or match. The taxonomy tag for the first successfully matched object may then be associated with the portion of financial data.

In an alternative embodiment, the row editor 306 (FIG. 3) finds similar matches. In this embodiment, if a predetermined portion of the title attribute of the XBRL taxonomy DOM 318 object matches the account title of the row in the general ledger 326 (FIG. 3), the similar taxonomy tag is provided to the user. For example, if the first six characters of the title of the portion of the financial data match the first six characters of the taxonomy tag, the title and taxonomy tag are similar. In alternative embodiments, a percentage of the characters must be the same, e.g., 60% of the characters must match. If there are several similar taxonomy tags, the several taxonomy tags may be stored in a datastore then the user may be provided with the several taxonomy tags and choose the taxonomy tag to associate with the portion of financial data. For example, the user may be presented with a menu, such as menu 130 (FIG. 1), in the user interface 102 (FIG. 1); the user chooses the taxonomy tag 132 (FIG. 1) to associate with the selected portion of financial data 124 (FIG. 1). If there is only one similar taxonomy tag, the one similar taxonomy tag can be associated with the portion of financial data without user involvement.

In still another embodiment, the row editor 306 (FIG. 3) may receive a selection to match all portions of financial data with a taxonomy tag. For example, a user selects the menu item 138 (FIG. 1) to match all portions of financial data with a taxonomy tag. The row editor 306 (FIG. 3) can select the first row of the general ledger 326 (FIG. 3) and find the first taxonomy tag that is similar to or the same as the account designation or account title. In embodiments, the row editor 306 (FIG. 3) traverses the XBRL taxonomy DOM 318 to find the first match. After finding the matching tag, the row editor 306 (FIG. 3) can associate the found tag with the row in the general ledger 326 (FIG. 3) in the design template 328 (FIG. 3). Then, the row editor 306 (FIG. 3) can select each subsequent row in the general ledger 326 (FIG. 3) and use similar operations to find the taxonomy tag that matches the account title for each subsequent row. In an alternative embodiment, the row editor 306 (FIG. 3) may present the user with a menu 130 (FIG. 1) to select from similar tags for each row that has two or more similar taxonomy tags. An embodiment of a method for automatically matching taxonomy tags with portions of data is described in conjunction with FIG. 5.

Display operation 410 displays the item in the XBRL taxonomy as mapped with the item of financial data. In embodiments, a viewer 220 (FIG. 2) provides a display of the design template 214 (FIG. 2) in a user interface 222 (FIG. 2). The display of the design template may be as shown in FIG. 1. For example, taxonomy tag 124 (FIG. 1) is shown as mapped to account 126 (FIG. 1).

Figure 5:
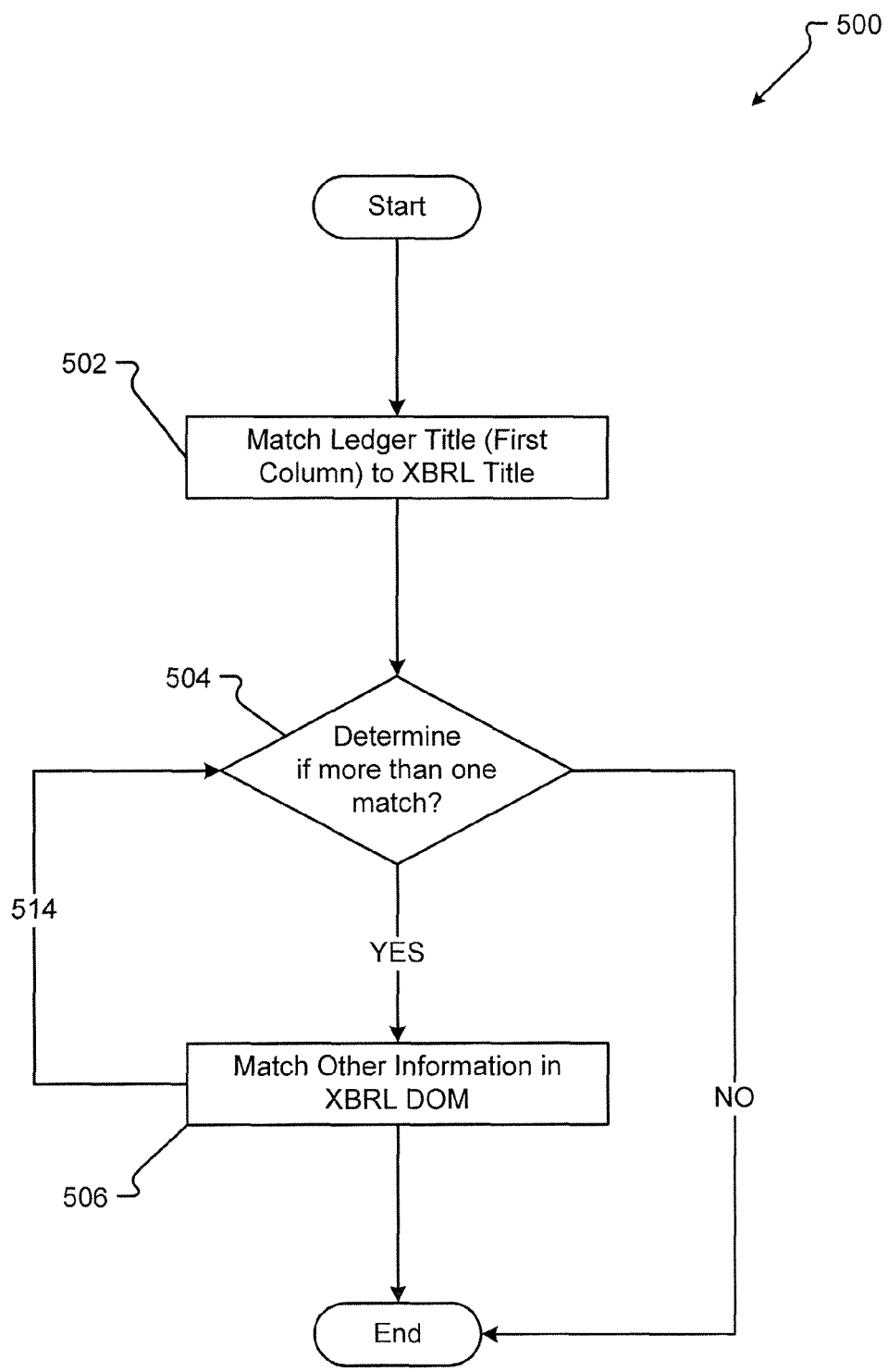
FIG. 5 is a flow diagram of an embodiment of a process for automatically matching taxonomy tags to financial data.

An embodiment of a method 500 for automatically matching an XBRL taxonomy tag to a portion of financial information is shown in FIG. 5. In embodiments, the steps described in conjunction with FIG. 5 are computer instructions executed on a computer system. The method 500 generally starts with a "Start" function and ends with an "End" function. The method 500 may be one embodiment of match operation 408 as described in conjunction with FIG. 4.

Match operation 502 matches a title in the general ledger to a title of an XBRL taxonomy. In an embodiment, the row editor 306 (FIG. 3), while traversing the XBRL taxonomy DOM 318 (FIG. 3), compares the title attribute of one or more objects in the XBRL taxonomy DOM 318 to the title of a row in the general ledger 326. If the title attribute and the title of the row are the same or similar, the row editor 306 (FIG. 3) matches the taxonomy tag associated with the object with the row of the general ledger 326 (FIG. 3). The taxonomy tag and the row of the general ledger 326 (FIG. 3) are then associated and the association saved in the XBRL design template 328 (FIG. 3). In some situations, the title attribute of more than one XBRL taxonomy DOM 318 object compares to the row in the general ledger 326 (FIG. 3). In alternative embodiments, another attribute other than the title attribute of the general ledger is matched to the XBRL taxonomy DOM 318 (FIG. 3).

Determine operation 504 determines if the title attribute of more than one XBRL taxonomy DOM 318 object matches the row in the general ledger 326 (FIG. 3). For example, if the match requires the first three characters of the title to match, there may be two or more title attributes having the same first three characters, as shown in drop down menu 130 (FIG. 1). In alternative embodiments, more than one title matches if the match is based on a percentage of the characters matching, if the first word of the tile matches, etc. If the title attribute of more than one XBRL taxonomy DOM 318 object does compare to the row in the general ledger 326 (FIG. 3), the process flows YES to match operation 506. If the title attribute of more than one XBRL taxonomy DOM 318 object does not compare to the row in the general ledger 326 (FIG. 3), the process flows NO to end.

Match operation 506 matches one or more items of other information in the XBRL DOM. For example, if the first match operation 502 yielded four matches, one or more other items of information are compared against the four matches. The row editor 306 (FIG. 3) or other component of the report layer 304, in embodiments, traverses the XBRL taxonomy DOM 318 (FIG. 3) to compare and match one or more other attributes of the XBRL taxonomy DOM 318 (FIG. 3) objects. For example, the column editor 308 (FIG. 3) compares a currency attribute of the DOM objects with a currency designation in the general ledger 326 (FIG. 3). The column editor 308 (FIG. 3) can compare the currency attribute with the currency in the currency column 142 (FIG. 1). For example, if the general ledger provides currencies in United States Dollars (USD), those taxonomy objects with an attribute having USD would match. All other taxonomy tags not having USD would be discarded. The flow may then flow back to determine operation 508, as represented by branch 514. If one of the currency values matches the currency attribute, the taxonomy tag of the object is matched and associated with the row of the general ledger 326 (FIG. 3). If more than object has a currency attribute that compares with the currency value, other attributes may be matched. For example, the country, the office or branch, the function or type of income, etc., may all be attributes that can be matched in the comparison.

In one embodiment, the matches contain more than one taxonomy tag but no final match can be made. In these situations, the final set of matching taxonomy tags may be presented to the user. The user can then choose which taxonomy tag to map to the data from the general ledger.

In an alternative embodiment, an algorithm may produce several matches. For example, the matches may be weighted by percentage of characters in the general ledger data matching a taxonomy tag. All matches above a certain threshold, for example, 60%, may be considered as matching. In another embodiment, the algorithm includes a statistical threshold, for example, the match is certain to a 95% confidence interval. The several matches may then be ranked by percentage or other value of relation to the general ledger data. The match with the highest rank for one or more attributes may be designated as the match according to the algorithm.

Figure 6:
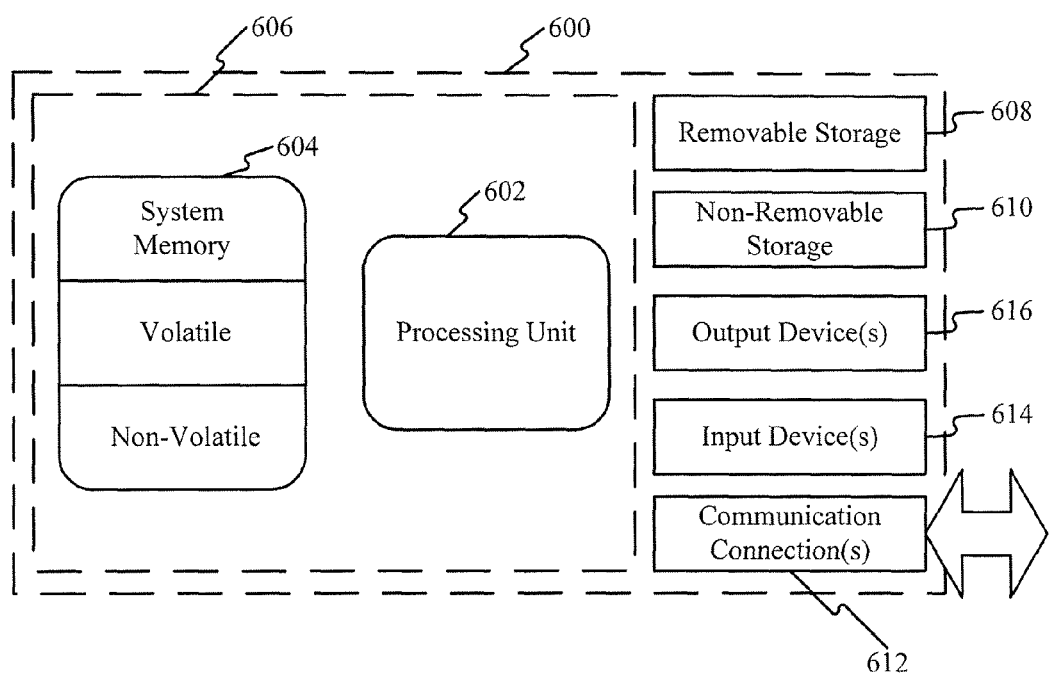
FIG. 6 is a block diagram of an embodiment of a computing system operable for assigning taxonomy tags to financial data.

With reference to FIG. 6, an embodiment of a computing environment for implementing the embodiments described herein is shown. In one embodiment, the system 100 (FIG. 1) is a software application executed at a server at a business' office. In alternative embodiments, the system 100 (FIG. 1) is a desktop, laptop, handheld device, or other computing system executing software for the business customer. Embodiments of the computer environment for the system 100 (FIG. 1) and the designer application 204 (FIG. 2) include a computer system, such as computer system 600. In alternative embodiments, one or more components of system 100 (FIG. 1) may operate on separate computers. For example, a row editor 306 (FIG. 3) may execute on a work station while the tree editor 312 (FIG. 3) executes on a server.

In its most basic configuration, computer system 600 typically includes at least one processing unit 602 and system memory 604. In embodiments, the designer application 204 (FIG. 2) is loaded into and run by the processing unit 602 from system memory 604 of either a computer. Depending on the exact configuration and type of computer system 600, memory 604 may be volatile (such as RAM), non-volatile (such as ROM, flash memory, etc.), or some combination of the two. This most basic configuration of the computer system 600 is illustrated in FIG. 6 by dashed line 606.

Additionally, device 600 may also have additional features/functionality. For example, device 600 includes additional storage (removable and/or non-removable) including, but not limited to, magnetic or optical disks or tape. Such additional storage is illustrated in FIG. 6 by removable storage 608 and non-removable storage 610. In embodiments, the designer application component 204 (FIG. 2) or other component described herein, general ledger datastore 324 (FIG. 3), XBRL taxonomies 314 (FIG. 3), or design template datastore 330 (FIG. 3), is stored in non-removable storage 610, although the software components to be installed, data, or XBRL taxonomies 314 (FIG. 3) may be saved into removable storage 608, and loaded into system memory 604 for use by or for execution by the processing unit 602 on the business computer. In some embodiments, the designer application 204 (FIG. 2) or other software components described herein, the taxonomies, or design templates are one of several components of a software system 100 (FIG. 1). Computer storage media includes volatile and nonvolatile, removable and non-removable media implemented in any method or technology for storage of information such as computer readable instructions, data structures, program modules, or other data.

Memory 604, removable storage 608, and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, for example, the design template 328 (FIG. 3), and which is accessed by device 600 and processor 602 on the business' computer. Any such computer storage media may be part of device 600.

Device 600 may also contain communications connection(s) 612 that allow the device to communicate with other devices. In embodiments, the communication connections 612 are used to send and/or receive data, for example, the XBRL taxonomies 314 (FIG. 3), over a network, such as the Internet. Communications connection(s) 612 is an example of communication media.

In embodiments, device 600 includes a graphical user interface that includes input devices 614 and output devices 616. Data selections for the XBRL taxonomy 202 (FIG. 2), general ledger 206 (FIG. 2), or find tag input 208 (FIG. 2), in embodiments, are selected with user input device(s) 614, and the data are displayed with output device(s) 616. Input device(s) 614 are also referred to as user interface selection devices and include, but are not limited to, a keyboard, a mouse, a pen, a voice input device, a touch input device, etc. Output device(s) 616 are also referred to as displays and include, but are not limited to, cathode ray tube displays, plasma screen displays, liquid crystal screen displays, speakers, printers, etc. These devices, either individually or in combination, form the graphical user interface 102 (FIG. 1) used to display data as described herein. All these devices are well know in the art and need not be discussed at length here.

Computer system 600 typically includes at least some form of computer readable media. Computer readable media can be any available media that can be accessed by processing unit 602. By way of example, and not limitation, computer readable media comprise computer storage media. Software system 100 (FIG. 1) and the components, methods, and/or algorithms described herein comprise such modules or instructions executable by computer system 600 that may be stored on computer storage medium. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A computer implemented eXtensible Business Reporting Language (XBRL) tag association system comprising:
   a processor; and
   a memory communicatively coupled to the processor, the memory having computer-executable instructions that when executed by the processor, provide:
   retrieving an XBRL taxonomy comprising a plurality of XBRL taxonomy tags;
   parsing the XBRL taxonomy to create an XBRL taxonomy document object model, the XBRL taxonomy document object model comprising a plurality of objects, each object of the plurality of objects having a title attribute corresponding to an XBRL taxonomy tag of the XBRL taxonomy;
   retrieving a general ledger, the general ledger comprising a plurality of rows, each row of the plurality of rows having a row title;
   receiving a selection to match each row of the plurality of rows in the general ledger to an XBRL taxonomy tag in the XBRL taxonomy;
   traversing the XBRL taxonomy document object model comprising:
       comparing a first descriptor in the portion of financial data with a first title attribute of the first object in the XBRL taxonomy document object model;
       comparing the first descriptor in the portion of financial data with a second title attribute of the second object in the XBRL taxonomy document object model, wherein the first object is a higher order object;

comparing a second descriptor in the portion of financial data with another attribute of the first object in the XBRL taxonomy document object model to further refine a search;

comparing the second descriptor in the portion of financial data with another attribute of the second object in the XBRL taxonomy document object model to further refine a search; and upon determining one or more attributes of one or more objects of the XBRL taxonomy document object model match a portion of financial data associated with at least one row in the general ledger, discarding other attribute data that does not apply to the match;

determining the first title attribute of the first object closely matches a first row title of a first row in the general ledger;

automatically mapping the first row in the general ledger to a first XBRL taxonomy tag corresponding to the first title attribute of the first object;

determining the second title attribute of the second object nearly matches a second row title of a second row in the general ledger;

providing a menu identifying at least a second XBRL taxonomy tag corresponding to the second title attribute of the second object;

receiving a selection of the second XBRL taxonomy tag; and mapping the second row in the general ledger to the second XBRL taxonomy tag;

providing an XBRL design template comprising the first XBRL taxonomy tag mapped to the first row and the second XBRL taxonomy tag mapped to the second row of the general ledger.

2. The computer implemented XBRL tag association system defined in claim 1, wherein an XBRL taxonomy tag is mapped after a first successful comparison of an attribute of an object in the XBRL taxonomy document object model to the descriptor in the portion of financial data.

3. The computer implemented XBRL tag association system defined in claim 1, wherein the XBRL taxonomy tag is displayed as mapped to the portion of financial data in a view of the design template.

4. The computer implemented XBRL tag association system defined in claim 3, wherein the XBRL taxonomy tag is associated with the portion of the financial data in the design template and the association is checked for correctness.

5. The computer implemented XBRL tag association system defined in claim 3, further comprising:
creating a first XBRL instance document from the design template comprising the portion of the financial data mapped to the XBRL taxonomy tag; and
providing a view of the first XBRL instance document.

6. The computer implemented XBRL tag association system defined in claim 5, further comprising:
receiving an update to the portion of the financial data;
creating a second XBRL instance document from the design template comprising the updated portion of the financial data mapped to the XBRL taxonomy tag; and
providing a view of the second XBRL instance document.

7. A computer storage medium not consisting of a propagated data signal and having computer-executable components stored thereon, the computer executable components executable in a computer system for mapping one or more eXtensible Business Reporting Language (XBRL) taxonomy tags to a plurality of rows in a general ledger, the components comprising:

a tag picker, the tag picker receiving a selection from a user interface to match a row title associated with each row of the plurality of rows in the general ledger with the one or more XBRL taxonomy tags;

a taxonomy parser, the taxonomy parser importing a XBRL taxonomy and parsing the XBRL taxonomy into an XBRL taxonomy document object model, the XBRL taxonomy document object model comprising a plurality of objects, each object of the plurality of objects having a title attribute corresponding to an XBRL taxonomy tag of the XBRL taxonomy;

a designer application in communication with the tag picker and the taxonomy parser, the designer application performing the following steps:
importing the XBRL taxonomy document object model and the general ledger; and
exporting a design template having a first XBRL taxonomy tag mapped to a first row and a second XBRL taxonomy tag mapped to a second row of the general ledger, the designer application comprising:
a row editor in communication with the user interface, the row editor responsive to the selection from the user interface, the row editor performing the following steps:
traversing the XBRL taxonomy document object model, comprising:
comparing a first descriptor in the portion of financial data with a first title attribute of a first object in the XBRL taxonomy document object model;
comparing the first descriptor in the portion of financial data with a second title attribute of a second object in the XBRL taxonomy document object model, wherein the first object is a higher order object;
comparing a second descriptor in the portion of financial data with another attribute of the first object in the XBRL taxonomy document object model to further refine a search;
comparing the second descriptor in the portion of financial data with another attribute of the second object in the XBRL taxonomy document object model to further refine a search; and
upon determining one or more attributes of one or more objects of the XBRL taxonomy document object model match a portion of financial data associated with at least one row in the general ledger, discarding other attribute data that does not apply to the match;
determining the first title attribute of the first object closely matches a first row title of a first row in the general ledger;
automatically mapping the first row in the general ledger to the first XBRL taxonomy tag corresponding to the first title attribute of the first object;
determining the second title attribute of the second object nearly matches a second row title of a second row in the general ledger;
providing a menu identifying at least the second XBRL taxonomy tag corresponding to the second title attribute of the second object;
receiving a selection of the second XBRL taxonomy tag; and
mapping the second row in the general ledger to the second XBRL taxonomy tag.

8. The components defined in claim 7, further comprising:
a column editor in communication with a user interface, the column editor receiving information related to the columns of a general ledger;
a report editor in communication with a user interface, the report editor receiving selections regarding content of an XBRL instance document; and
a tree editor in communication with a user interface, the tree editor providing information about a hierarchical view of the XBRL taxonomy.

9. The components defined in claim 8, wherein the designer application comprises one of a group consisting of the row editor, the column editor, the report editor, a company editor, and a tree editor.

10. The components defined in claim 7, further comprising:
a processing engine in communication with the designer application, the processing engine matching the design template with financial data associated with at least one row of the plurality of rows in the general ledger, the processing engine providing an XBRL instance document, the processing engine matching the design template with the financial data by finding a percentage of the same characters in both the design template and the financial data.

11. The components defined in claim 7, further comprising:
a viewer in communication with the processing engine, the viewer providing a display of the XBRL instance document.

12. A method executable in a computer system for mapping one or more eXtensible Business Reporting Language (XBRL) tags to one or more portions of financial data in a general ledger, the method comprising:
retrieving an XBRL taxonomy comprising a plurality of XBRL taxonomy tags;
parsing the XBRL taxonomy to create an XBRL taxonomy document object model, the XBRL taxonomy document object model comprising a plurality of objects, each object of the plurality of objects having a title attribute corresponding to an XBRL taxonomy tag of the XBRL taxonomy;
retrieving the general ledger, the general ledger comprising a plurality of rows, each row of the plurality of rows associated with a portion of financial data and having a row title;
receiving a selection to match each row of the plurality of rows in the general ledger to an XBRL taxonomy tag in the XBRL taxonomy;
traversing the XBRL taxonomy document object model comprising:
comparing a first descriptor in the portion of financial data with a first title attribute of the first object in the XBRL taxonomy document object model;
comparing the first descriptor in the portion of financial data with a second title attribute of the second object in the XBRL taxonomy document object model, wherein the first object is a higher order object;
comparing a second descriptor in the portion of financial data with another attribute of the first object in the XBRL taxonomy document object model to further refine a search; and
comparing the second descriptor in the portion of financial data with another attribute of the second object in the XBRL taxonomy document object model to further refine a search; and
upon determining one or more attributes of one or more objects of the XBRL taxonomy document object model match a portion of financial data associated with at least one row in the general ledger, discarding other attribute data that does not apply to the match;
determining the first title attribute of the first object closely matches a first row title of a first row in the general ledger;
automatically mapping the first row in the general ledger to a first XBRL taxonomy tag corresponding to the first title attribute of the first object;
determining the second title attribute of the second object nearly matches a second row title of a second row in the general ledger;
providing a menu identifying at least a second XBRL taxonomy tag corresponding to the second title attribute of the second object;
receiving a selection of the second XBRL taxonomy tag; and
mapping the second row in the general ledger to the second XBRL taxonomy tag;
providing an XBRL design template comprising the first XBRL taxonomy tag mapped to the first row and the second XBRL taxonomy tag mapped to the second row of the general ledger.

13. The method as defined in claim 12, further comprising:
determining if a title attribute of more than one object in the XBRL taxonomy document object model compares to a third row in the general ledger;
if the title attribute of more than one object in the XBRL taxonomy document object model does not compare to the third row in the general ledger, associating the third row in the general ledger and the XBRL taxonomy tag of the object that has the title attribute that matches a third row title of the third row in the general ledger; and
if the title attribute of more than one object in the XBRL taxonomy document object model does compare to the third row in the general ledger, comparing one or more other items of information in the general ledger with one or more other attributes of the more than one object in the XBRL taxonomy document object model.

14. The method as defined in claim 12, further comprising:
storing the XBRL design template;
creating a first XBRL instance document from the XBRL design template and the general ledger; and
repeating, at a second time, the creation of a second XBRL instance document from the XBRL design template and updated data in the general ledger.

15. The method as defined in claim 12, wherein the step of associating the second row in the general ledger and the second XBRL taxonomy tag of the second object comprises:
providing two or more selections of XBRL taxonomy tags that nearly match the second row title of the second row in the general ledger;
receiving a selection of the second XBRL taxonomy tag; and
associating the selected second XBRL taxonomy tag with the second row in the general ledger.

* * * * *